United States Patent
Kiely et al.

(10) Patent No.: US 9,799,358 B2
(45) Date of Patent: Oct. 24, 2017

(54) DETECTION AND REMEDIATION OF HEAD CONTAMINATION

(71) Applicant: Seagate Technology LLC, Cupertino, CA (US)

(72) Inventors: James Dillon Kiely, Edina, MN (US); Jon D. Trantham, Chanhassen, MN (US)

(73) Assignee: SEAGATE TECHNOLGY LLC, Cupertino, CA (US)

( * ) Notice: Subject to any disclaimer, the term of this patent is extended or adjusted under 35 U.S.C. 154(b) by 425 days.

(21) Appl. No.: 14/037,139

(22) Filed: Sep. 25, 2013

(65) Prior Publication Data

US 2015/0085632 A1    Mar. 26, 2015

(51) Int. Cl.
| | | |
|---|---|---|
| G11B 21/02 | (2006.01) | |
| G11B 5/41 | (2006.01) | |
| G11B 5/40 | (2006.01) | |
| G11B 5/455 | (2006.01) | |
| G11B 5/60 | (2006.01) | |

(52) U.S. Cl.
CPC ............... *G11B 5/41* (2013.01); *G11B 5/40* (2013.01); *G11B 5/455* (2013.01); *G11B 5/607* (2013.01)

(58) Field of Classification Search
CPC .. G11B 5/41; G11B 5/40; G11B 5/455; G11B 5/607; G11B 27/36
See application file for complete search history.

(56) References Cited

U.S. PATENT DOCUMENTS

| | | |
|---|---|---|
| 5,396,476 A | 3/1995 | Asthana |
| 6,583,959 B1 | 6/2003 | Hall |
| 6,624,958 B1 | 9/2003 | Alva |
| 7,450,343 B2 | 11/2008 | Huang |
| 7,715,135 B1 * | 5/2010 | Sutardja et al. ............... 360/40 |
| 8,593,753 B1 * | 11/2013 | Anderson ....................... 360/75 |
| 8,665,546 B1 | 3/2014 | Zhao et al. |
| 8,873,191 B2 | 10/2014 | Li et al. |
| 8,929,008 B1 | 1/2015 | O'Dell et al. |
| 8,995,078 B1 | 3/2015 | Setuwanto et al. |
| 2003/0202273 A1 * | 10/2003 | Smith ............................. 360/69 |
| 2006/0044658 A1 * | 3/2006 | Ma ................................. 360/31 |
| 2006/0092543 A1 | 5/2006 | Che et al. |
| 2008/0239581 A1 * | 10/2008 | Ikai et al. ..................... 360/272 |
| 2009/0168268 A1 | 7/2009 | Druist et al. |

(Continued)

OTHER PUBLICATIONS

Zhang et al. "Predicting Air Bearing Contamination Using Air Flow Pattern Analysis", Journal of Tribology, Jan. 2008, 011002-1-011002-4.

(Continued)

*Primary Examiner* — Andrew L Sniezek
(74) *Attorney, Agent, or Firm* — Hollingsworth Davis, LLC

(57) ABSTRACT

A heat generating component of a slider is energized at a predetermined frequency. The heat generating component changes a spacing between a medium and the slider. A temperature response proximate a media-facing surface of the slider is measured while the heating element is energized. Based on the measured temperature response, a determination is made as to whether the media-facing surface is contaminated. In response to determining that the media-facing surface is contaminated, remedial action is taken.

20 Claims, 6 Drawing Sheets

(56) References Cited

U.S. PATENT DOCUMENTS

| | | |
|---|---|---|
| 2011/0235207 A1* | 9/2011 | Yang ................................ 360/75 |
| 2012/0120521 A1 | 5/2012 | Kurita et al. |
| 2015/0085632 A1* | 3/2015 | Kiely ....................... G11B 5/41 |
| | | 369/53.38 |
| 2016/0093320 A1 | 3/2016 | Aria et al. |

OTHER PUBLICATIONS

File History for U.S. Appl. No. 15/153,103.

* cited by examiner

DETECTION AND REMEDIATION OF HEAD CONTAMINATION

SUMMARY

Embodiments described in the disclosure are directed to approaches for detecting and mitigating contamination of a magnetic recording head. A method according to some embodiments involves energizing a heat generating component of a slider at a predetermined frequency. The heat generating component changes a spacing between a medium and the slider. The response of a temperature sensor, proximate a media-facing surface of the slider, is measured while the heating element is energized. Based on the measured temperature response, the media-facing surface is determined to be contaminated. In response to determining that the media-facing surface is contaminated, remedial action is taken.

According to another embodiment, an apparatus includes a slider having a heat generating component that changes spacing between the slider and a medium. The slider includes a temperature sensor that determines temperatures proximate a media-facing surface of the slider. The apparatus further includes a controller coupled to the slider. The controller is configured to energize the heat generating component at a predetermined frequency and measure a temperature response via the temperature sensor while the heating element is energized. Based on the measured temperature response, the controller determines that the media-facing surface is contaminated and takes remedial action in response to determining that the media-facing surface is contaminated.

Some embodiments involve iterative testing. A heat generating component of a slider is energized at a predetermined frequency. The heat generating component changes spacing between a medium and the slider and a temperature response proximate a media-facing surface of the slider is measured while the heating element is energized. Based on the measured temperature response, a cleaning process is performed. In response to the cleaning process, the heat generating component is again energized at the predetermined frequency and a second temperature response is measured proximate the media-facing surface while the heating element is energized. Based on the second measured temperature response, it is determined whether the media-facing surface is contaminated. In response to determining that the media-facing surface is contaminated, remedial action is taken.

These and other features and aspects of various embodiments may be understood in view of the following detailed discussion and accompanying drawings.

DETAILED DESCRIPTION

Figure 1:
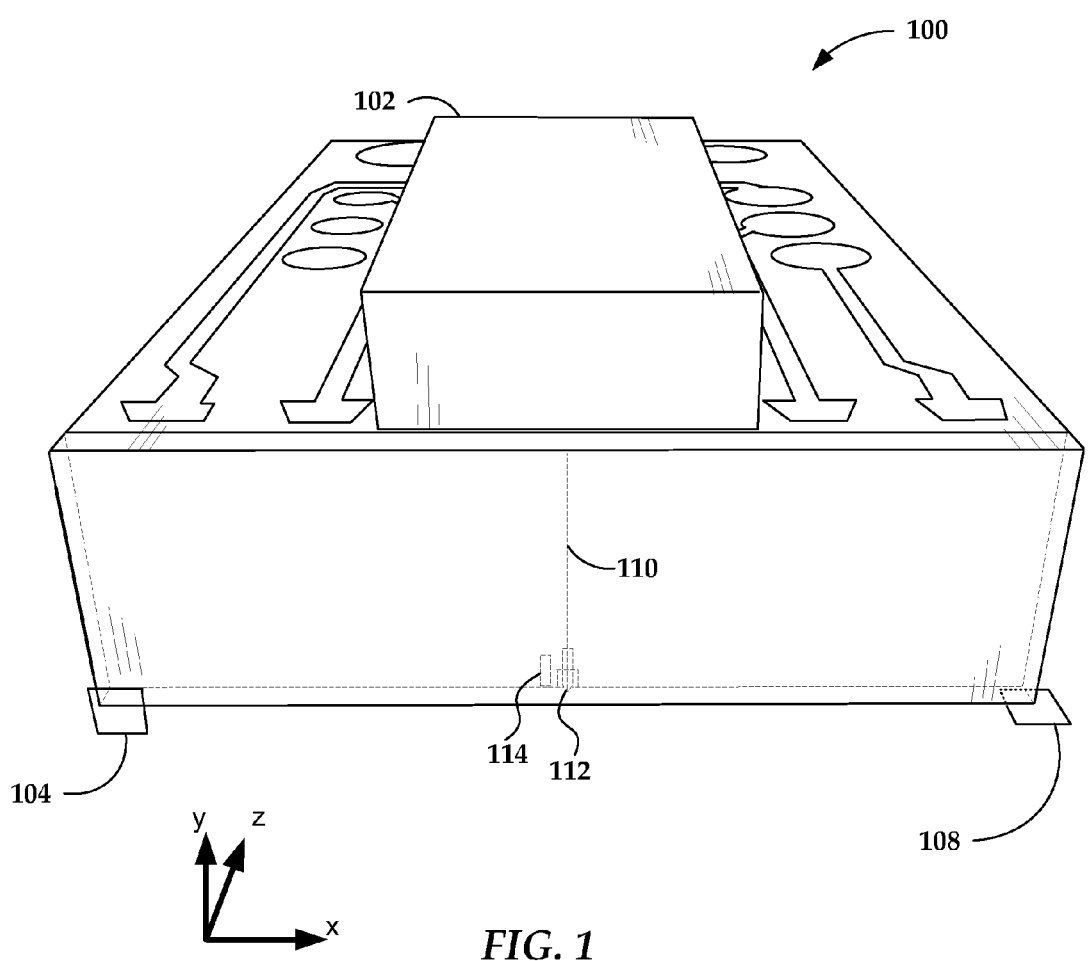
FIG. 1 is a perspective view of a slider assembly according to an example embodiment.

Magnetic data storage systems commonly include one or more magnetic recording heads with one or more transducers that respectively write (e.g., a writer) and read (e.g., a reader) information to and from a magnetic storage medium. In systems that utilize heat-assisted magnetic recording (HAMR) techniques, an additional transducer exists for imparting heat energy into the media. It is desirable to have a relatively small distance or separation between a transducer and its associated media (e.g., 3 nm). This distance or spacing is sometimes referred to as head-media spacing.

To establish head-media spacing in a storage system, detection of head-media contact may be used. One approach for detecting contact involves evaluating a temperature profile for a recording head transducer before, during, and after contact between the head transducer and a surface of a magnetic recording medium using a thermal sensor in the recording head. When the head transducer is actuated by a thermal actuator, the head transducer surface temperature will increase with the actuation due to the heat generated by the thermal actuator. The head transducer temperature at this stage is generally higher than the temperature of the medium. As such, the medium may act as a heat sink. However, the head transducer is separated from the medium by a thin layer of air, and which limits the amount of heat transfer therebetween.

When the head transducer contacts the medium, the head transducer can directly conduct heat to the medium. As such, the head transducer surface temperature drops due to an increase heat transfer rate resulting from the initial contact. The head transducer surface temperature then increases due to the continued thermal actuator heating as well as the added frictional heating. The change in temperature or excursion in temperature trajectory can be used to declare head-media contact.

Temperature responses at a head-media interface can be used to detect other recording environment factors. For example, magnetic storage medium topography can be surveyed, such as for detecting asperities and other features of the recording medium surface. Also, contamination of the media-facing surface of the magnetic head can be detected. This is helpful in heat assisted magnetic recording (HAMR) which is sensitive to head contamination. There is a high risk of head-disc interface contamination in a HAMR device due to elevated head and media temperatures. It would be advantageous to have an in-situ method of monitoring the interface for any deleterious changes, such as contamination. Once detected, steps can be taken to mitigate the contamination and prevent costly delays and/or repairs.

An example data storage system, a hard disk drive, includes a magnetic recording head arrangement. The magnetic recording head arrangement is located on a slider positioned proximate a rotating magnetic medium. The magnetic medium is configurable for reading and/or writing data with the magnetic recording head arrangement. The surface of the magnetic recording head arrangement facing the magnetic medium (the media-facing surface) includes a head media interface (HMI), and may be configured as an air bearing surface (ABS).

Proximate the media-facing surface, the magnetic recording head arrangement includes one or more magnetic read heads protected by one or more shields for reading data from the magnetic medium. Also proximate the media-facing surface, the magnetic recording head arrangement includes a write transducer having one or more magnetic write heads for writing data to the magnetic medium. The magnetic write head(s) include a write coil, a main write pole, and a write return pole. A write heater assembly can also be positioned near one of the write poles or between the write poles.

In some embodiments, the magnetic recording head arrangement is configured for heat assisted magnetic recording (HAMR) by including a slider assembly 100 shown in FIG. 1. It should be noted that the concepts described hereinbelow related to contamination detection and remediation need not be limited to HAMR devices. Similar concepts can be applied to conventional magnetic recording heads, and to any other device having an analogous HMI.

The slider assembly 100 includes an energy source 102 (e.g., laser diode) configured to produce laser light that energizes an optical antenna, also referred to as a near field transducer (NFT) 112. The laser light produced by the energy source 102 is guided through an optical waveguide 110 and is focused on the NFT 112 by a focusing device such as a tapered optical waveguide or a parabolic mirror. Heat generated by operation of the recording head is measured by one or more thermal sensors 114. The sensors may be located near a media-facing surface 108. The energy source 102 is shown here as integral to the slider assembly, although in other arrangements a laser or other energy source may be externally located.

The slider assembly 100 tracks across the magnetic recording medium in a direction generally indicated by the x-axis of FIG. 1, also referred to as the cross-track direction. Relative to the slider assembly 100, the magnetic recording medium rotates in the z-axis direction, referred to as the downtrack direction. The edge of the slider that first passes over any position of the rotating recording medium in the downtrack direction is referred to as the leading edge, and the edge of the slider that is last to pass over the position of the recording medium is referred to as the trailing edge, designated by plane 104. The slider assembly 100 reads and/or writes bits to the rotating magnetic recording medium as the magnetic recording medium rotates relative to the slider.

At or near the media-facing surface 108 is a thermal sensor 114. Although thermal sensor 114 can be a variety of types of thermal sensors, thermal sensor 114 is described herein as a resistance temperature sensor composed of materials having a known temperature coefficient of resistance (TCR). Other types of thermal sensors can be employed, such as a varistor or a thermocouple, for example. One example of a TCR sensor is a dual-ended temperature coefficient of resistance sensor (DETCR). A TCR sensor measures temperature change by measuring the change in resistance or rate of change in resistance, across the sensor. The thermal sensor 114 measures the temperature change at media-facing surface 108 induced by thermal condition changes from air pressure, clearance, head operation, and contact, among other changes.

Figure 2:
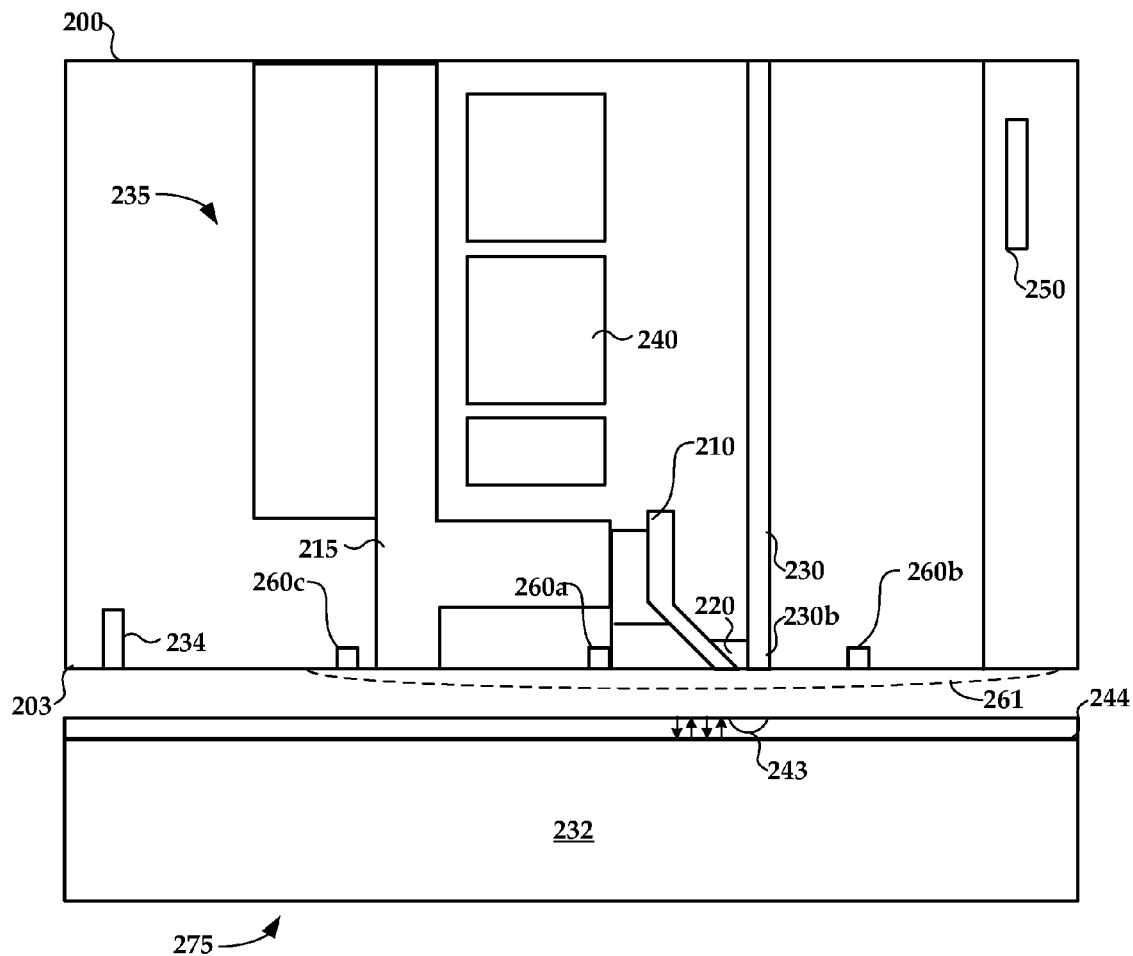
FIG. 2 is a cross-sectional view of a magnetic recording head arrangement, in accordance with various embodiments.

In FIG. 2, a cross-section diagram shows a head transducer 200 according to various embodiments. An NFT 220 is located between a write pole 210 and a waveguide 230 at a media-facing surface 203. The head transducer 200 is shown positioned over a writeable medium 275 (e.g., magnetic disk) generally includes a plate or substrate 232 on which at least a hard magnetic layer 244 is deposited or otherwise formed. A small portion or spot 243 of the layer 244 is heated via waveguide 230 and NFT 220 to reduce the coercivity of the material enough so that the magnetic field from the magnetic write pole 210 is strong enough to change the magnetization direction of the recording layer 244. Bits of information may then be recorded in the form of a perpendicular upward downward magnetization direction for a series of magnetic domains in the layer 244.

The portion of head transducer 200 illustrated in FIG. 2 may include a number of heat generating components at the media-facing surface 203, such as write coil 240, NFT 220, and a heater 250. Due to thermal expansion of the surrounding material, the heat can cause a thermal protrusion at the media-facing surface 203, indicted by dashed line 261. Generally, the heater 250 is used to finely adjust head-media spacing near the protrusion to obtain a desired spacing between the media 275 and read/write transducers 234, 235.

One or more thermal sensors, e.g., TCR sensors, can be located within a protrusion region at one or more optional locations. Historically these sensors have been used during manufacturing to set heat-disk spacing. Thermal sensors may also be used for thermal asperity (TA) detection. As shown in FIG. 2, optional thermal sensors 260a, 260b, 260c located at different locations within the region of protrusion 261. In many embodiments only one thermal sensor is used. In some embodiments, as illustrated by thermal sensor 260a, a thermal sensor is located in the region of the writer 235, near the write pole 210, return pole 215, and/or the NFT 220.

In one configuration, at least a portion of thermal sensor 260a is co-extensive with a portion of the return pole 215 along an axis normal to the media-facing surface 203. Thermal sensor 260a is situated in an uptrack/downtrack direction from at least one of the NFT 220 and write pole 210. In some configurations, a thermal sensor is located outside the region of the writer 235. For example, thermal sensor 260b is located between a waveguide 230, which is optically coupled to NFT 220, and heater 250 (e.g., positioned nearer to waveguide 230 than heater 250). Thermal sensor 260c illustrates a third optional location within the protrusion region of the air bearing surface and adjacent the return write pole 215 (but outside of the writer components) between the writer 245 and the reader 234.

Thermal sensors 260a, 260b, 260c are coupled to signal processing circuitry as is known in the art. The circuitry determines temperatures at or near the media-facing surface 203, and those measured temperatures can be used for a number of purposes, such as controlling the heater 250 to adjust head-media spacing at the protrusion region 261. It has been demonstrated that for a head transducer having a thermal sensor reasonably close to the NFT 220, it is possible to measure changes in thermal conductance across the head-disc interface and to use this to monitor changes, such as those due to clearance changes or due to contamination.

Contamination on the media-facing surface 203 can have an effect on the temperature readings due to changes in heat transfer from the surface 203. For example, if the contaminant is a thermal insulator, higher than normal temperatures may result at the media-facing surface 203 due to a decrease in heat transfer to the medium 275. This may result in the protrusion 261 being greater than normal for a given heater power. The reverse effect may be seen if the contaminant is a thermal conductor, or otherwise decreases thermal resistance (e.g., increases surface area for convective heat transfer).

Figure 3:
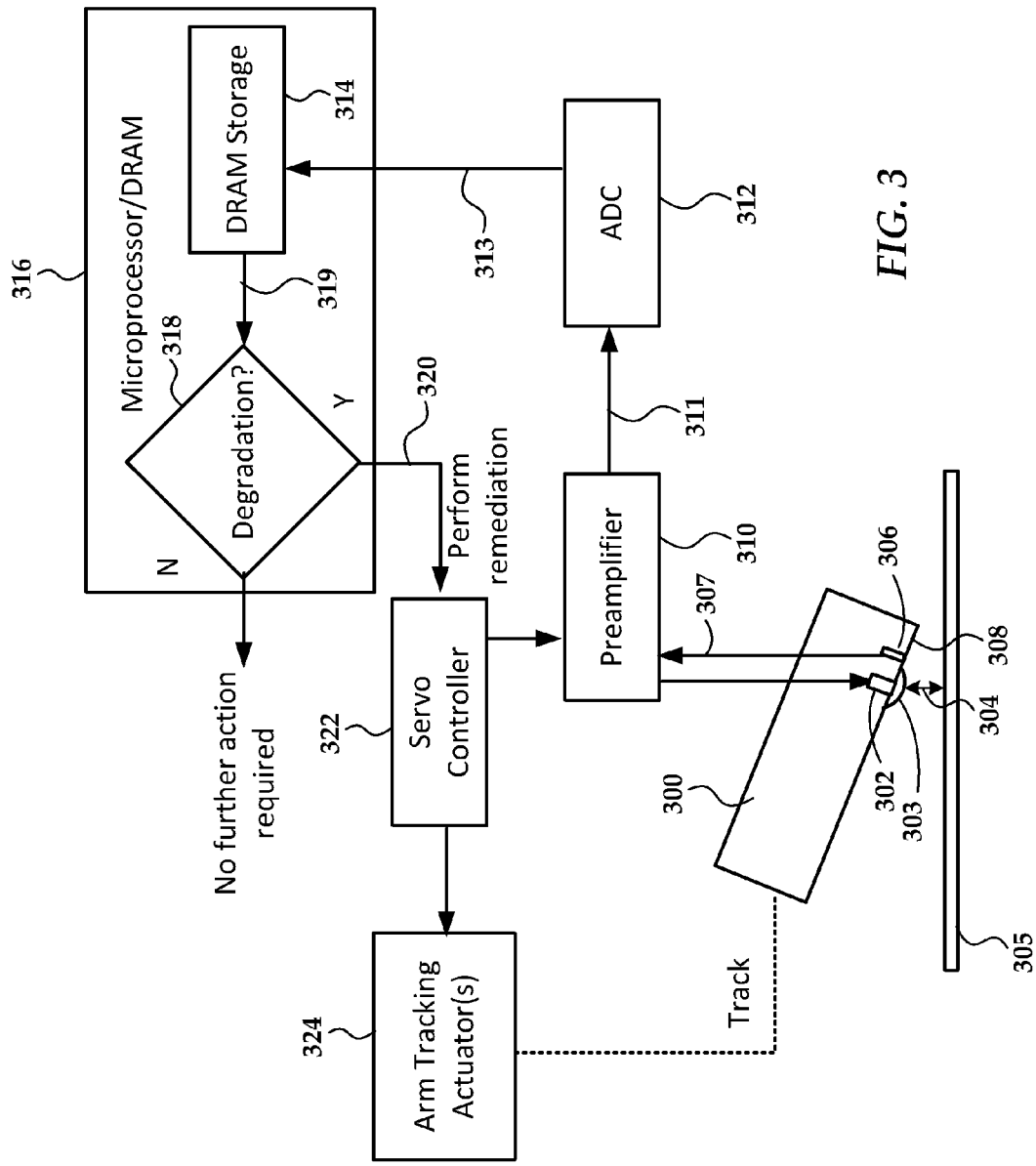
FIG. 3 is a block diagram of an apparatus according to an example embodiment.

These changes in protrusion region response due to contamination can be used to take remedial action. In reference now to FIG. 3, a block diagram illustrates a system according to an example embodiment that can detect and remediate contamination. The system includes a recording head 300 that may be configured similarly to the slider assembly and/or head transducer shown in FIGS. 1 and 3. The recording head 300 at least includes a heater 302 that varies a head-media spacing 304 between a close point 303 of the recording head 300 and a recording media 305. The recording head 300 also includes a thermal sensor 306 that can detect temperatures at or near a media-facing surface 308.

The heater 302 and thermal sensor 306 are electrically coupled to a preamplifier 310. The preamplifier 310 conditions signals sent to and received from the recording head 300. For example, signals 307 from the thermal sensor 306 are received, conditioned (e.g., band-pass filter) and amplified at the preamplifier 310, and sent to an analog-to-digital converter (ADC) 312. The ADC 312 turns the conditioned thermal sensor signals into discrete digital values 313 by sampling electrical signals 311 received from the preamplifier 310.

The digital values 313 are stored, at least temporarily, in a memory such as dynamic random access memory (DRAM) 314. The DRAM 314 is part of a controller 316 that includes a microprocessor and the DRAM 314. Other processing may be performed on the thermal data before or after it is stored in DRAM 314, e.g., averaging, digital signal processing (DSP), conversion between time domain and frequency domain, etc. The thermal data may also be stored in a non-volatile memory (not shown) for longer-term usage, such as historical tracking of thermal profiles.

The controller 316 includes hardware, firmware, and or software instructions represented here as a post-processing decision block 318. The decision block 318 reads sampled and processed thermal data 319 from DRAM 314, e.g., at regular or irregular intervals, in response to system events, etc. This data 319 at least includes a currently or recently measured temperature profile measured by the sensor 306 as the close point 303 flies above and eventually contacts the media 305. The data 319 may also include a historical pattern of data for comparison with the current measurements. Deviations between the historical and current profiles may lead to a decision 320 to perform remedial action, such as cleaning, adjusting a heating power of the slider, verifying slider write operations with reads, issuing a warning to a host operating system, and putting the hard drive in a write-protect state.

The decision 320 may ultimately command a servo controller 322 to cause an actuator 324 to move the recording head 300 to a particular location on the media 305. This movement may include full stroke seeks or brief hard contact with the media 305. The contact would generally occur in a region where no data is stored, e.g., a region reserved for parking the recording head 300 during idle or shutdown.

Figure 4:
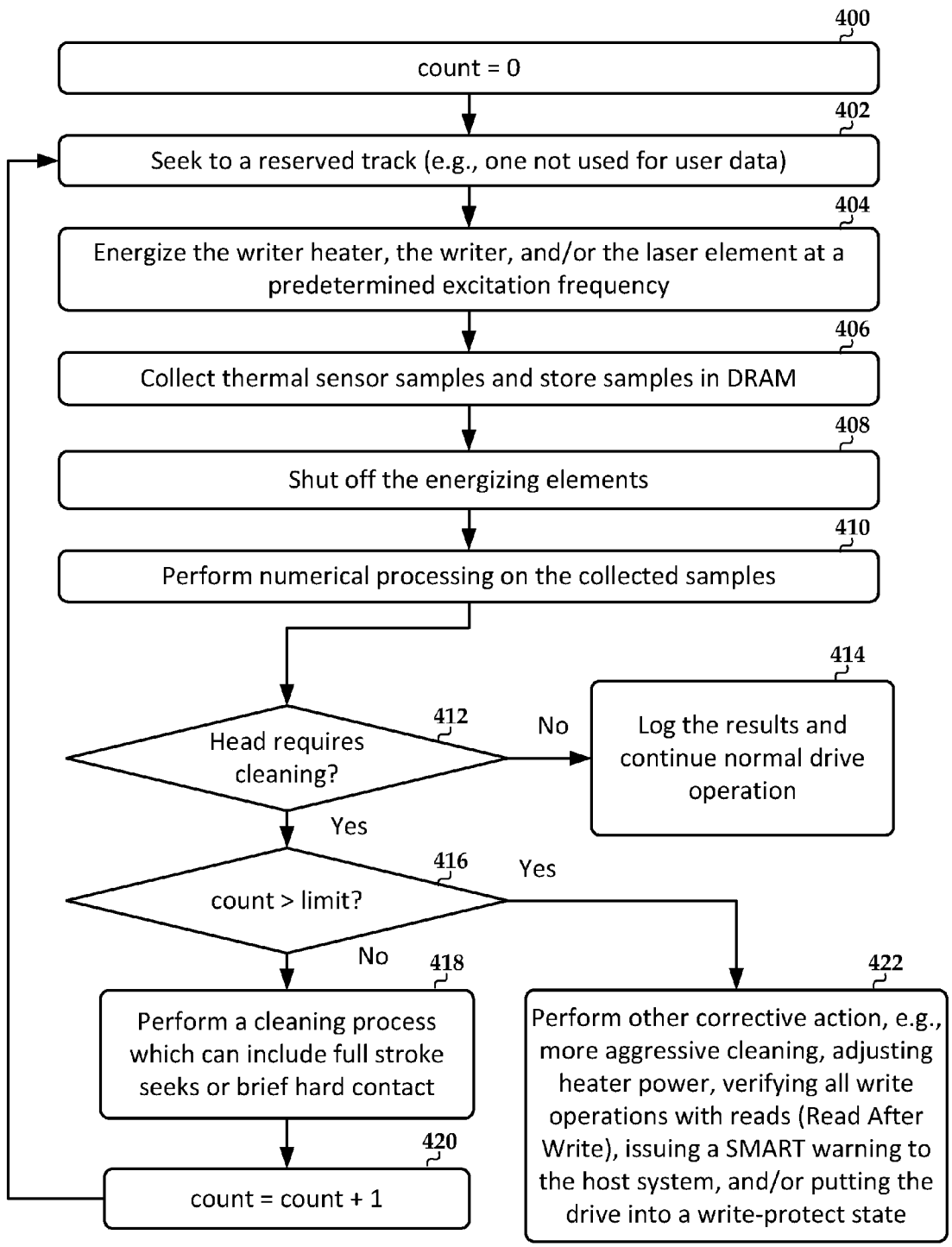
FIG. 4 is a flowchart of a self-test procedure according to an example embodiment.

The decision block 318 may be part of a self-test of the system that is performed periodically and/or when triggered by an event. Such triggering events may include, deterioration of bit error rate, increase of error recovery effort, tracking errors, servo read errors, etc. In response, the system performs a self-test to determine the level of deterioration. An example of a self-test procedure according to an example embodiment is shown in the flow chart of FIG. 4. This procedure may be triggered in response to any events described above, including the passage of time.

The procedure begins by initializing 400 a counter, which is used to track a number of cleaning attempts. The drive seeks 402 to a reserved track, one not used for user data, for example. Any combination of writer heater, writer, and laser element are energized 404 at a predetermined excitation frequency. Thermal sensor samples are collected and stored 406 in DRAM. The samples are collected while energizing the other elements at block 404 at different levels to obtain temperature as a function of heater power applied to heating elements. After collection and storage 406 is complete, the heating/energizing elements are shut off 408.

Numerical processing is performed 410 on the collected samples. This may include DSP to extract a frequency component of the temperature signal that corresponds to the excitation frequency. The processed samples may be formatted as discrete elements, curves, parametric data, etc. From the results of the processing 410, a determination 412 is made to whether or not the head requires cleaning. If the head is clean, results are logged 414 (e.g., in a test log on the drive) and normal drive operations continue.

If the head requires cleaning, and it is determined 416 that the counter has not exceeded a limit, a cleaning process is performed 416 which can include full stroke seeks or brief hard contact. Thereafter, the counter is incremented 420 and operations 402, 404, 406, 408, 410, and 412 are repeated. Eventually, if repeated cleanings fail to clear the contamination (as determined at decision block 416), other corrective/remedial actions may be performed 422. Those remedial actions may include any combination of more aggressive cleaning, adjusting heater power, verifying all write operations with reads (Read After Write), issuing a Self-Monitoring, Analysis and Reporting Technology (SMART) warning to the host system, and/or putting the drive into a write-protect state.

Figure 5:
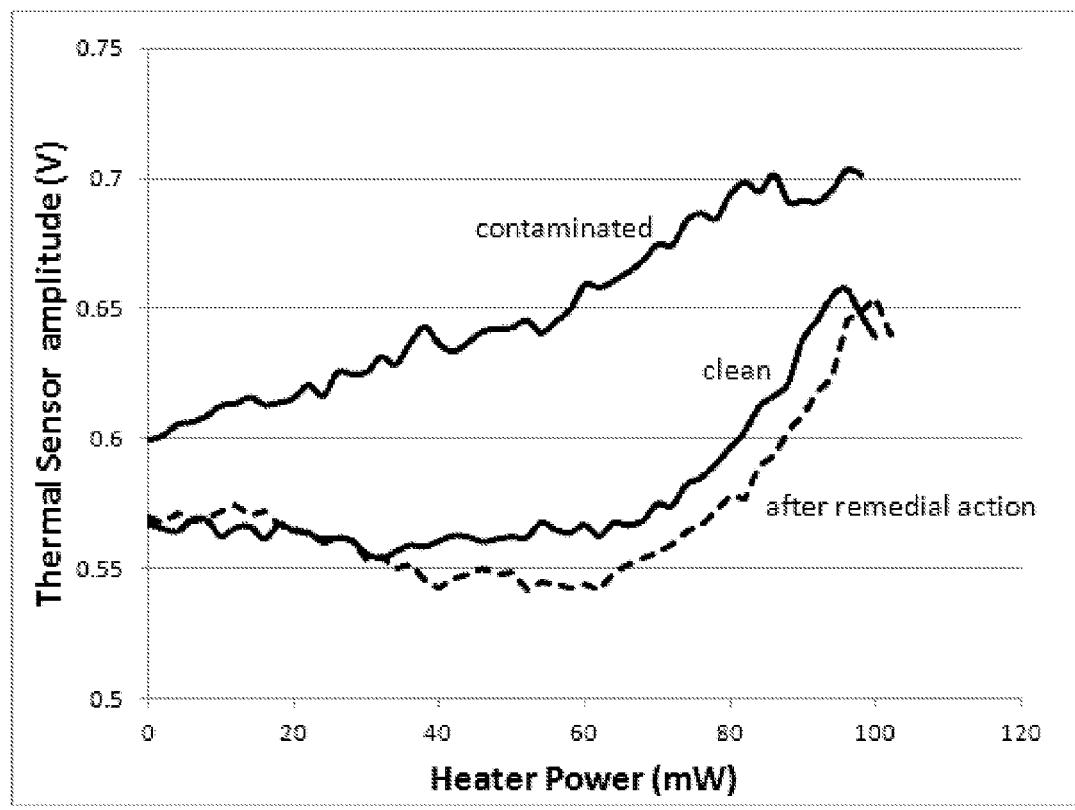
FIG. 5 is a graphs of data that demonstrates contamination detection according to example embodiments.

In reference now to FIG. 5, a graph shows measured data that demonstrates results of contamination detection procedures according to example embodiments. In this example, the laser was pulsed or modulated at a frequency in the range of 100-800 kHz. The thermal sensor response at that frequency was monitored. Changes in the thermal sensor AC response indicate changes in heat transfer due to either clearance changes, head contamination, or both.

The graph in FIG. 5 shows the effect of head contamination. In this data, the laser power was held constant and the change in the thermal sensor AC response was measured as a function of heater power. In the first test, represented by the data labeled "clean," the heater power was ramped. The thermal sensor response shows an increase as the sensor approaches the media surface. Then, a set of 50 band erases were performed, which is known to cause contamination on the head.

The test after first set of 50 band erases (labeled "contaminated") shows a very different response in the thermal sensor when the heater is ramped. The amplitude is generally higher and has a different shape (or slope) than that for a clean interface. This change in response signifies a change in interface contamination. Immediately after this test, the head was cleaned by taking remedial actions that are known to remove contamination. After cleaning, the test was repeated, and the response from a clean interface was regained, as demonstrated by the third curve (labeled "after remedial action") in FIG. 5.

As FIG. 5 illustrates, a representative temperature response of the slider may be used to detect contamination. The representative temperature response may include previously measured responses of the slider, such as first and second tests shown in FIG. 5, and may be occasionally updated. A selected one of the responses (or features thereof) may be stored as representative, or a combination of tested responses may be used (e.g., average, median, etc.). A plurality of representative examples measured over an operational period of the slider may be used to make the determination. The representative temperature response may also be based on general data for all sliders of a particular type. In these examples, an initial or updated representative response may be set at the factory, via a firmware update, via the host, etc.

Determining that the media-facing surface is contaminated may involve comparing the measured temperature response to any combination of representative temperature responses described above. This may involve comparing any combination of absolute sensor reading, curve shapes, slopes, first or higher derivative curves, contact detection anomalies, etc. Generally, the algorithms used to compare different functions are known in the art, and may be implemented in conventional computing hardware and/or custom processing circuitry.

Figure 6:
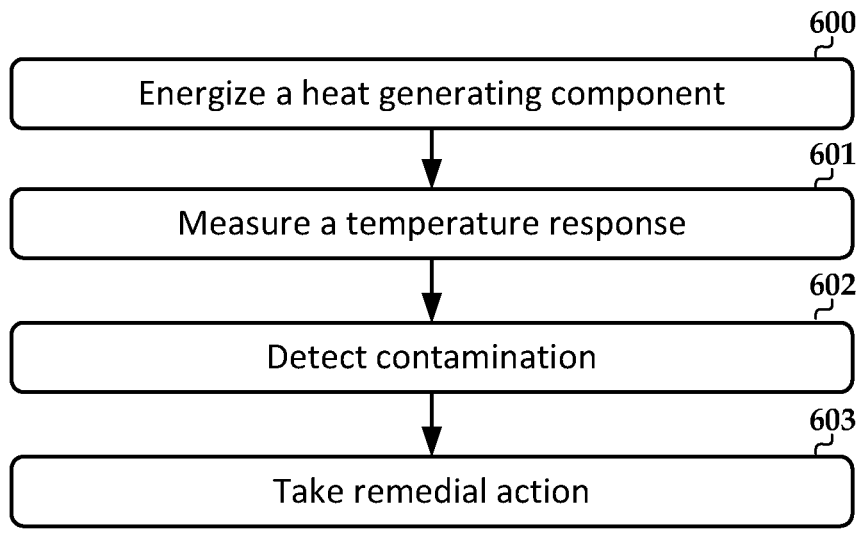
FIGS. 6 and 7 are flowcharts of methods according to example embodiments.

In reference now to FIG. 6, a flowchart illustrates a method according to an example embodiment. The method involves energizing 600 a heat-generating component, such as a laser, resistive heater, write coil, etc. A temperature response is measured 601, e.g., via a TCR sensor mounted near a contact surface. Based on the response, contamination may be detected 602. If so, remedial action 603 is taken.

Figure 7:
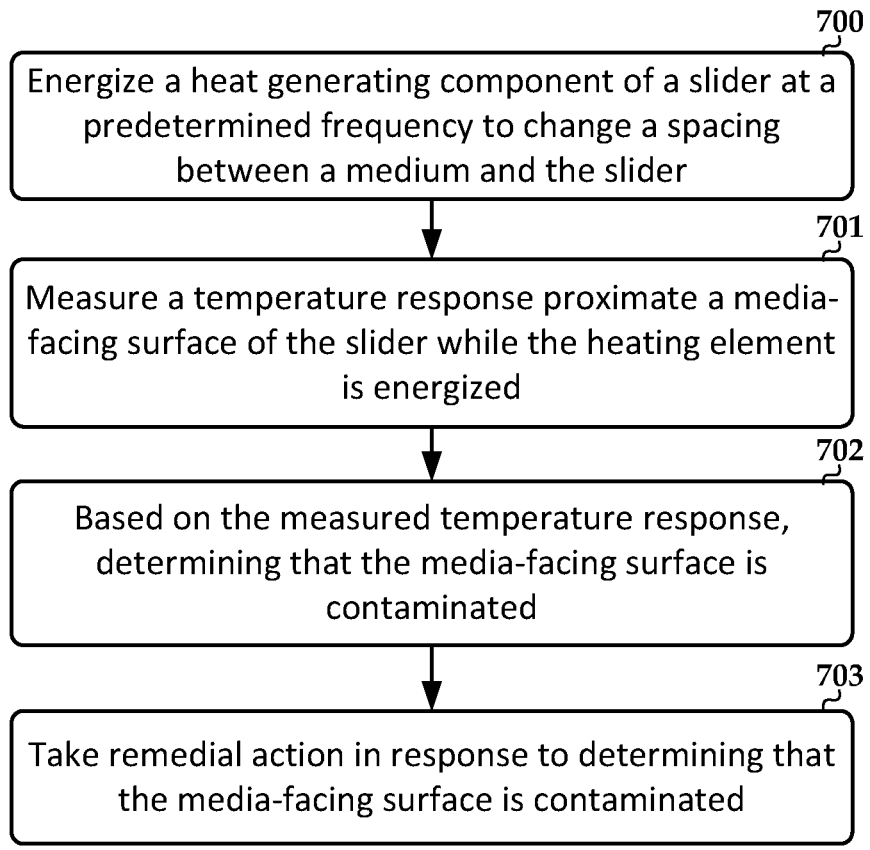

In reference now to FIG. 7, a flowchart illustrates a method according to another example embodiment. The method involves energizing 700 a heat-generating component of a slider, such as a laser, resistive heater, write coil, etc. The heat generating component is energized at a predetermined frequency and changes a spacing between a medium and the slider. A temperature response proximate a media-facing surface of the slider is measured 701 while the heating element is energized. Based on the measured temperature response, it can be determined 702 whether the media-facing surface is contaminated. Remedial action is taken 703 in response to determining that the media-facing surface is contaminated.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to facilitate performing functions as described above.

It is to be understood that even though numerous characteristics of various embodiments have been set forth in the foregoing description, together with details of the structure and function of various embodiments, this detailed description is illustrative only, and changes may be made in detail, especially in matters of structure and arrangements of parts illustrated by the various embodiments to the full extent indicated by the broad general meaning of the terms in which the appended claims are expressed.

What is claimed is:

1. A method comprising:
    energizing a heat generating component of a slider at a predetermined frequency to change a spacing between a medium and the slider by creating a protruded area of a media-facing surface proximate the heat generating component;
    measuring a temperature response proximate the protruded area while the heat generating component is energized via a dedicated dual-ended temperature coefficient of resistivity sensor positioned proximate a near-field transducer, the sensor being separate from a write element and a read element and configured to measure changes in thermal conductance across the spacing between the medium and the slider;
    based on the measured temperature response, determining that the media-facing surface is contaminated; and
    taking remedial action in response to determining that the media-facing surface is contaminated.

2. The method of claim 1, wherein the heat generating component comprises at least one of a near-field transducer, a resistive heater, and a write coil.

3. The method of claim 1, wherein the remedial action comprises at least one of full stroke seeks of the slider across the medium and brief hard contacts between the slider and the medium.

4. The method of claim 1, wherein the remedial action comprises at least one of adjusting a heating power of the slider, verifying all slider write operations with reads, issuing a warning to a host operating system, and putting a hard drive comprising the slider in a write-protect state.

5. The method of claim 1, further comprising storing at least one representative temperature response of the slider, and wherein determining that the media-facing surface is contaminated comprises comparing the measured temperature response to the representative temperature response.

6. The method of claim 5, wherein the representative temperature response was previously measured from the slider.

7. The method of claim 6, wherein the representative temperature response comprises an average of a plurality of representative examples measured over an operational period of the slider.

8. The method of claim 1, wherein the spacing between the medium and the slider is less than ten nanometers.

9. An apparatus comprising:
    a controller capable of being coupled to a slider, the slider comprising: a heat generating component that changes a spacing between the slider and a medium by creating a protruded area of a media-facing surface proximate the heat generating component; and a dedicated dual-ended temperature coefficient of resistivity sensor positioned proximate a near-field transducer, the sensor being separate from a write element and a read element that determines temperatures proximate the protruded area and is configured to measure changes in thermal conductance across the spacing between the medium and the slider, the controller configured to:
    energize the heat generating component at a predetermined frequency;
    measure a temperature response via the dedicated dual-ended temperature coefficient of resistivity sensor while the heat generating component is energized;
    based on the measured temperature response, determine that the media-facing surface is contaminated; and
    take remedial action in response to determining that the media-facing surface is contaminated.

10. The apparatus of claim 9, wherein the heat generating component comprises at least one of a near-field transducer, a resistive heater, and a write coil.

11. The apparatus of claim 9, wherein the remedial action comprises at least one of full stroke seeks of the slider across the medium and brief hard contacts between the slider and the medium.

12. The apparatus of claim 9, wherein the remedial action comprises at least one of adjusting a heating power of the slider, verifying all slider write operations with reads, issuing a warning to a host operating system, and putting the apparatus in a write-protect state.

13. The apparatus of claim 9, further comprising memory to store at least one representative temperature response of the slider, and wherein the controller is further configured to determine that the media-facing surface is contaminated comprising comparing the measured temperature response to the representative temperature response.

14. The apparatus of claim 13, wherein the representative temperature response was previously measured from the slider.

15. The apparatus of claim 14, wherein the representative temperature response comprises an average of a plurality of representative examples measured over an operational period of the slider.

16. The apparatus of claim 9, wherein the spacing between the medium and the slider is less than five nanometers.

17. A method comprising:
energizing a heat generating component of a slider at a predetermined frequency, wherein the heat generating component changes a spacing between a medium and the slider by creating a protruded area of a media-facing surface proximate the heat generating component;
measuring a temperature response via a dedicated dual-ended temperature coefficient of resistivity sensor proximate the protruded area while the heat generating component is energized, the dual-ended temperature coefficient of resistivity sensor positioned proximate a near-field transducer, the sensor being separate from a write element and a read element and configured to measure changes in thermal conductance across the spacing between the medium and the slider;
based on the measured temperature response, performing a cleaning process;
in response to the cleaning process, energizing the heat generating component at the predetermined frequency and measuring a second temperature response proximate the protruded area of the media-facing surface while the heat generating component is energized;
based on the second measured temperature response, determining whether the media-facing surface is contaminated; and
taking remedial action in response to determining that the media-facing surface is contaminated.

18. The method of claim 17, wherein the cleaning process comprises at least one of full stroke seeks of the slider across the medium and brief hard contacts between the slider and the medium.

19. The method of claim 17, wherein the remedial action comprises at least one of a repeat of the cleaning process, adjusting a heating power of the slider, verifying slider write operations with reads, issuing a warning to a host operating system, and putting a hard drive comprising the slider in a write-protect state.

20. The method of claim 17, further comprising logging results of the cleaning process and continuing normal operation in response to determining that the media-facing surface is not contaminated.

* * * * *